United States Patent [19]

Haikawa

[11] Patent Number: 4,986,958

[45] Date of Patent: Jan. 22, 1991

[54] FUEL ASSEMBLY

[75] Inventor: Katsumasa Haikawa, Hitachi, Japan

[73] Assignee: Hitachi, Ltd., Tokyo, Japan

[21] Appl. No.: 261,996

[22] Filed: Oct. 25, 1988

[30] Foreign Application Priority Data

Nov. 2, 1987 [JP] Japan .................. 62-275775

[51] Int. Cl.$^5$ .................................. G21C 3/00
[52] U.S. Cl. ............................ 376/419; 376/424; 376/428; 376/435
[58] Field of Search ................ 376/428, 435, 424, 419

[56] References Cited

U.S. PATENT DOCUMENTS

| | | | |
|---|---|---|---|
| 4,378,329 | 3/1983 | Uchikawa et al. | 376/435 |
| 4,683,113 | 7/1987 | Mochida et al. | 376/419 |
| 4,789,520 | 12/1988 | Morimoto et al. | 376/419 |

Primary Examiner—Stephen J. Lechert, Jr.
Assistant Examiner—Nina Bhat
Attorney, Agent, or Firm—Antonelli, Terry, Stout & Kraus

[57] ABSTRACT

A fuel assembly for use in a boiling water reactor has a multiplicity of fuel rods. In the fuel assembly, among the fuel rods located in the periphery (for example, the outermost periphery) of the cross section of the fuel assembly, the proportion of fuel rods whose enrichment in their respective lower regions are greater than the average enrichment in the lower region of the fuel assembly is less than the proportion of fuel rods whose enrichment in their respective upper regions are greater than the average enrichment in the upper region of the fuel assembly.

4 Claims, 8 Drawing Sheets

PROPORTION OF FUEL RODS WHOSE ENRICHMENT IN THEIR RESPECTIVE UPPER REGIONS ARE GREATER THAN THE AVERAGE ENRICHMENT IN THE UPPER REGION OF THE FUEL ASSEMBLY AMONG FUEL RODS LOCATED IN THE PERIPHERY OF THE UPPER REGION OF THE FUEL ASSEMBLY (%)

FUEL ROD NUMBER → 1  2  3  4  5

FUEL ASSEMBLY

BACKGROUND OF THE INVENTION

1. Field of the Invention

The present invention relates to a fuel assembly and, more particularly, to a fuel assembly suitable for use in a boiling water reactor.

2. Description of the Related Art

The core of such a boiling water reactor is provided with a plurality of fuel assemblies which are spaced apart from one another at predetermined intervals and in which a plurality of control rods which are inserted between adjacent fuel assemblies.

The fuel assembly has an upper tie plate, a lower tie plate and a plurality of fuel rods whose opposite ends are supported by the upper and lower tie plates. Each of the fuel rod includes a multiplicity of fuel pellets. A channel box is mounted on the upper tie plate to surround a fuel bundle.

The maximum power in the core provided with such fuel assemblies is obtained by multiplying the product of the following three kinds of peaking and the average power of the fuel assemblies within the core. A first peaking from among the three kinds of peaking is a radial power peaking which is the proportion of the maximum power of the fuel assemblies within the reactor core to the average power of fuel assemblies. A second peaking is an axial power peaking which is the proportion of the maximum power to the average power of the reactor core in the vertical direction thereof. A third peaking is a local power peaking which is the proportion of the maximum power of the fuel rods in the fuel assembly to the average rods power in the fuel assembly. The power P of each fuel rod in the fuel assembly is given by $$P = \phi \cdot \delta_f \cdot N$$

where $\phi$ is the thermal neutron flux in the position of the fuel rod, $\delta_f$ is the fission cross section of a fissile material and N is the density of atoms in the fissile material in the fuel rod (hereinafter referred to as "fuel atoms").

In order to efficiently burn the fuel and to prolong its burn-up period, it is necessary to increase the so-called infinite multiplication factor of the fuel assembly. As is known, to increase the infinite multiplication factor, it is effective to increase the density of fuel atoms in a region in which thermal neutron flux level is high, as well as to decrease the density of fuel atoms in a region in which thermal neutron flux level is low. In the above-described boiling water reactor, the thermal neutron flux level is high in the periphery of the fuel assembly, but is low in the central portion due to the non-uniform distribution of a moderator for neutrons, the neutron absorption effect of the fuel rod itself and so forth. Accordingly, it is desirable that a fuel assembly of the type which is used in the boiling water reactor be formed such that the density of fuel atoms in the periphery of the fuel assembly is greater than that in the central portion.

The fuel assembly disclosed in Japanese Patent Unexamined Publication No. 58-26292 is known as a fuel assembly capable of satisfying such a demand.

The fuel assembly disclosed in Japanese Patent Unexamined Publication No. 58-26292 is constructed in the following manner. A plurality of fuel rods for use in a reactor which employs a fissile material as fuel are incorporated in the fuel assembly in parallel to one another and in an integral form. The average density of the fissile material in the fuel rods in the periphery of the fuel assembly is selected so as to be greater than the average density of the fissile material in the fuel rods in the central portion of the fuel assembly. In a manner similar to that disclosed in U.S. Pat. No. 4,229,258, the proportion of fissile material contained in each of the fuel rods is changed in the axial direction so that the infinite multiplication factor in the upper portion of the fuel assembly becomes greater than the infinite multiplication factor in the lower portion of the fuel assembly. Thus, the infinite multiplication factor of the overall fuel assembly is increased and the burn-up period of the fuel assembly is consequently prolonged.

Recently, fuel with a high degree of burn-up has been developed and there has been a trend toward an increase in the enrichment of a fuel pellet of the type which is loaded in a fuel rod.

SUMMARY OF THE INVENTION

It is, therefore, an object of the present invention to provide a fuel assembly whose axial power peaking can be suppressed and whose fuel economy is improved by the effective utilization of neutrons.

It is another object of the present invention to provide a fuel assembly such that a decrease of its infinite multiplication factor can be suppressed.

A first feature of the present invention resides in the fact that, the proportion of fuel rods whose enrichment in their lower regions is greater than the average enrichment in the lower region of the fuel assembly among the fuel rods located in the periphery of a fuel assembly, is smaller than the proportion of fuel rods whose enrichment in their upper regions is greater than the average enrichment in the upper region of the fuel assembly among the fuel rods located in the periphery of a fuel assembly.

A second feature of the present invention resides in the fact that, in the upper region of a fuel assembly, the proportion of fuel rods whose enrichment in their upper regions is greater than the average enrichment in the upper region of the fuel assembly is not less than 50 percent of the total number of fuel rods located in the periphery of the fuel assembly, whereas, in the lower region of the fuel assembly, the proportion of fuel rods whose enrichment in their lower regions is greater than the average enrichment in the lower region of the fuel assembly is not greater than 20 percent of the total number of fuel rods located in the periphery of the fuel assembly.

In accordance with the first feature of the present invention, at least the fuel rods whose fuel enrichment in the upper portions thereof is greater than the average enrichment in the upper region of the fuel assembly are present in the periphery of the upper region of the fuel assembly. Accordingly, since the neutrons in the periphery of the fuel assembly, in which neutron flux level is high, can be effectively utilized, good fuel economy can be achieved. Among the fuel rods located in the periphery of the fuel assembly, the proportion of fuel rods whose enrichment in their respective lower regions are greater than the average enrichment in the lower region of the fuel assembly is less than the proportion of fuel rods whose enrichment in their respective upper regions are greater than the average enrichment in the upper region of the fuel assembly. Accordingly, it is possible to decrease the local power peaking in the lower region of the fuel assembly which has a low void fraction, in particular, the local power peaking in the periphery of the lower region.

In accordance with the second feature of the present invention, in the upper region of the fuel assembly, at least 50 percent of the fuel rods located in the periphery of the fuel assembly are fuel rods whose enrichment in their respective upper regions are greater than the average enrichment in the upper region of the fuel assembly. Accordingly, since neutrons in the periphery in which neutron flux level is high can be effectively utilized, good fuel economy can be achieved. With this arrangement at least 50 percent of the fuel rods located in the periphery of the fuel assembly and has enrichment in their respective upper regions greater than the average enrichment in the upper region of the fuel assembly. Accordingly, the increment of the infinite multiplication factor of the fuel assembly does not rapidly decrease. Further, the proportion of fuel rods whose enrichment in their respective lower regions are greater than the average enrichment of the lower region of the fuel assembly among the fuel rods located in the periphery of the fuel assembly does not exceed 20 percent. Accordingly, it is possible to diminish the local power peaking in the lower region of the fuel assembly having a low void fraction, in particular the local power peaking in the periphery of the fuel assembly, and hence the axial power peaking. In addition, owing to the above-noted functions, the quantity of fissile material in a new fuel assembly (the exposure of fuel assembly is zero) to be loaded in a reactor core can be increased, and therefore the exposure of fuel can be increased.

DETAILED DESCRIPTION OF THE PREFERRED EMBODIMENTS

The present inventor examined a fuel assembly having a further enhanced enrichment and hence a further high burn-up, while utilizing the concept disclosed in Japanese Patent Unexamined Publication No. 58-26292, that is, the feature in which the enrichment of the upper regions of fuel rods disposed in the periphery of a fuel assembly are greater than the average enrichment of the upper region of the fuel assembly, while the enrichment of the lower regions of the fuel rods disposed in that periphery are made greater than the average enrichment of the lower region of the fuel assembly, whereby fuel economy is improved. From this examination, the present inventor discovered the following problem: since, in the aforesaid fuel assembly, fuel rods having higher enrichment are disposed in the periphery in which neutron flux level is high and, furthermore, it is necessary to further enhance the enrichment so as to extend burn-up, the peaking in the axial power distribution which is formed in the lower region further increases. As a result, the maximum linear power density of each of the fuel rods may exceed its permissible value.

To obtain a means for solving the abovedescribed problem, the present inventor examined in various aspects of the fuel assembly disclosed in Japanese Patent Unexamined Publication No. 58-26292. In this examination, the present inventor employed a fuel assembly in which the quantity of fissile material in its periphery was greater than that in its central portion and in which the total quantity of fissile material was increased. First, the present inventor investigated the reason why the axial power peaking formed in the lower region increased when the total quantity of fissile material was increased in a fuel assembly in which the quantity of fissile material in the periphery was greater than that in the central portion. From this investigation, the following fact was discovered: That is, the void fraction in the lower region of the fuel assembly is small compared with that in the upper region and therefore the effect of slowing down of neutrons is large. The effect of slowing down of neutrons in the periphery portion of the cross section of the fuel assembly is larger than that in the central. Accordingly, in a case where the quantity of fissile material is increased in the whole fuel assembly, a local power peaking becomes excessively large in the periphery of the lower region, thus resulting in an increase in the axial power peaking.

Figure 1:
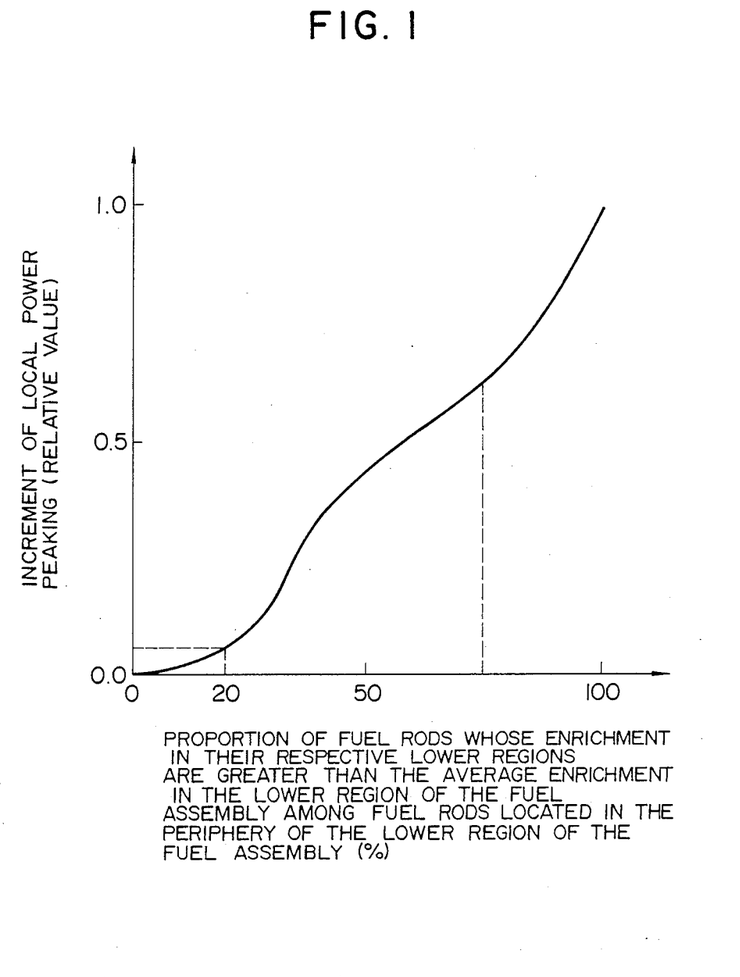
FIG. 1 is a characteristic chart which shows the relationship between the proportion of fuel rods whose enrichment is greater than the average enrichment in the lower region among the fuel rods disposed in the periphery of the lower region of a fuel assembly and the increment of a corresponding local power peaking.

Based on this finding, further investigations were made while changing the quantity of fissile material in the periphery of the lower region, and the characteristic shown in FIG. 1 was obtained. The characteristic shown in FIG. 1 represents the relationship between the proportion of fuel rods in the fuel rods disposed in the periphery (the outermost periphery), whose enrichment in their respective lower regions are greater than the average enrichment in the lower region of the fuel assembly and the increment of the local power peaking of the fuel assembly. As can be seen from FIG. 1, when the proportion of the fuel rods whose enrichment in their respective lower region are greater than the average enrichment in the lower region of the fuel assembly exceeds 20% of the total number of fuel rods disposed in the periphery, then the increment of the local power peaking becomes remarkably large. For this reason, it is desirable that the proportion of the fuel rods whose enrichment in their respective lower region are greater than the average enrichment in the lower region of the fuel assembly is selected to be not greater than 20% in the periphery of the fuel assembly. If, in the periphery of the fuel assembly, the proportion of fuel rods having a large enrichment is selected to be not greater than the above numerical value, it is possible to suppress a remarkable increase in the axial power peaking and hence to reduce the maximum linear power density of each fuel rod to a level below its permissible value.

Figure 2:
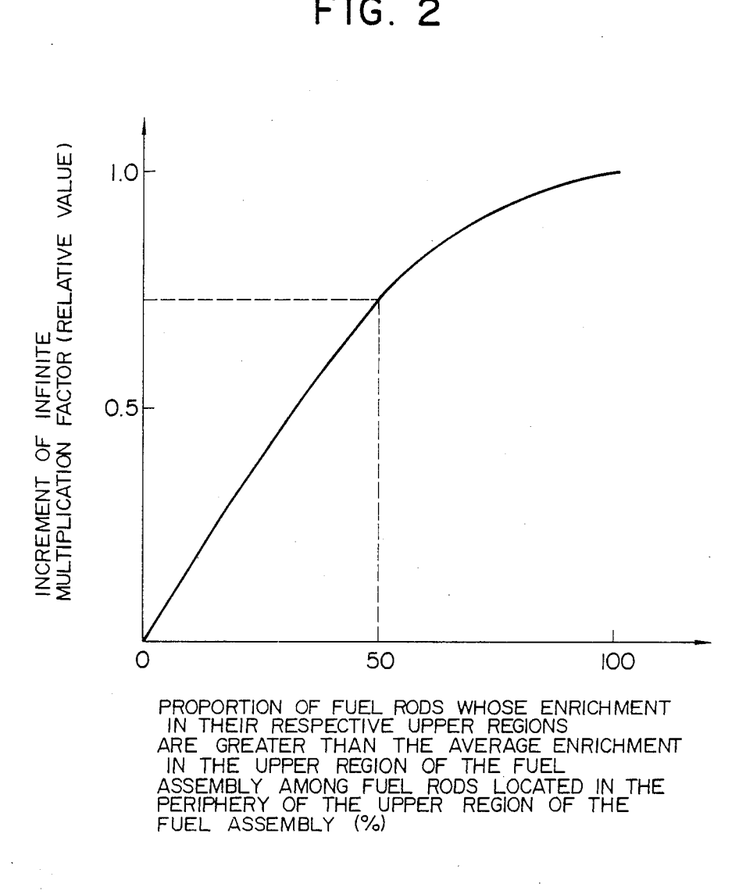
FIG. 2 is a characteristic chart which shows the relationship between the proportion fuel rods whose enrichment is greater than the average enrichment in the upper region among the fuel rods disposed in the periphery of the upper region of the fuel assembly and the increment of a corresponding infinite multiplication factor.

In addition to the investigation as to the lower region of the fuel assembly, the present inventor investigated the influence in the upper region of the fuel assembly which was exerted by the proportion of fuel rods in the fuel rods disposed in the periphery (the outermost periphery), whose enrichment in their respective upper regions was greater than the average enrichment in the upper region of the fuel assembly. From this investigation, the characteristic shown in FIG. 2 was obtained: That is, when the proportion of fuel rods whose enrichment in their respective upper regions are greater than the average enrichment in the upper region of the fuel assembly becomes less than 50% of the total number of fuel rods disposed in the periphery, then the increment of the infinite multiplication factor of the fuel assembly is remarkably reduced. Accordingly, if the proportion of fuel rods whose enrichment in their respective upper regions is greater than the average enrichment in the upper region of the fuel assembly is at least 50% of the total number of fuel rods disposed in the periphery, it is possible to effectively utilize the effect of the fuel assembly, disclosed in Japanese Patent Unexamined Publication No. 58-26292, whose enrichment is enhanced in its periphery. However, even if, the proportion of fuel rods whose enrichment in their respective regions are greater than the average enrichment in the upper region of the fuel assembly are selected to be not less than 50% of the total number of fuel rods disposed in the periphery of the fuel assembly, since the void fraction in the upper region of the fuel assembly is high, the local power peaking does not increase to such an extreme level that may adversely affect the maximum linear power density of each of the fuel rods (that is, to such an extent that the maximum linear power density of each fuel rod exceeds its permissible value).

Figure 3:
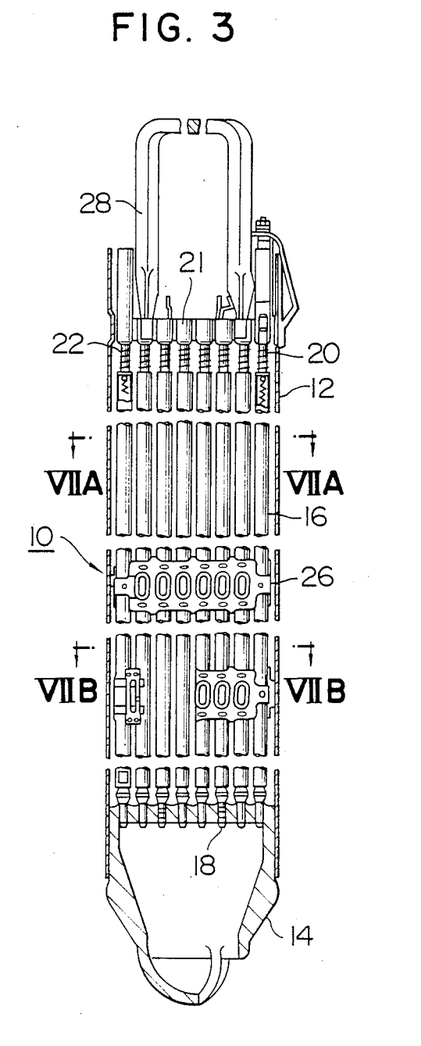
FIG. 3 is a diagrammatic view showing the construction of a preferred embodiment of a fuel assembly according to the present invention which is suitable for use in a boiling water reactor.
Figure 4:
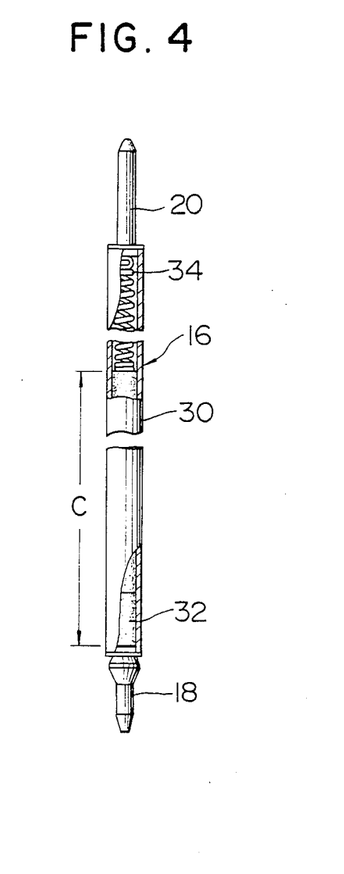
FIG. 4 is a diagrammatic view showing the construction of one of the fuel rods shown in FIG. 3.

One preferred embodiment of a fuel assembly which is implemented on the basis of the results of the above-described examinations in accordance with the present invention is described below with reference to FIGS. 3, 4 and 5.

As illustrated, a fuel assembly 10 has a lower tie plate 14, a water rod 17, a plurality of fuel rods 16, and an upper tie plate 21. The upper and lower ends of the water rod 17 and each of the fuel rods 16 are supported by the lower tie plate 14 and the upper tie plate 21, respectively. A channel box 12 is mounted on the upper tie plate 21. The lower tie plate 14 is mounted on the lower end of the channel box 12. A plurality of openings are formed in the lower tie plate 14 and the lower end plugs 18 of the respective fuel rods 16 are inserted into the openings. The fuel rods 16 are urged downwardly by expansion springs 22 attached to their respective upper end plugs 20. A plurality of fuel spacers 26 are disposed in the fuel assembly 10 in the axial direction thereof to keep the space between the adjacent fuel rods 16 at a predetermined interval. A handle 28 is mounted on the top of the upper tie plate 14.

The fuel rods 16 each have a cladding pipe 30 whose opposite ends are hermetically closed by the lower end plug 18 and the upper end plug 20, respectively, and a multiplicity of fuel pellets 32 are charged into the cladding pipe 30. These fuel pellets 32 are pressed in the axial downward direction by a spring 34.

Figure 5:
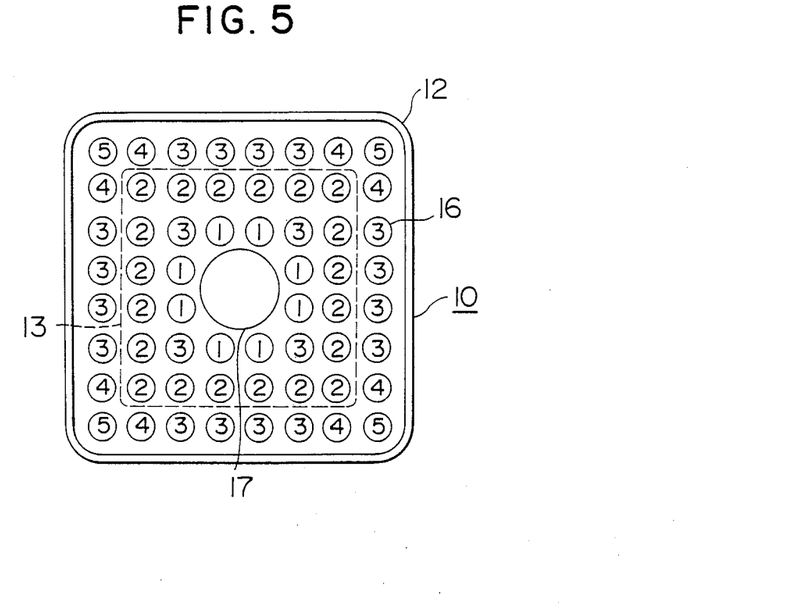
FIG. 5 is a diagrammatic view showing a concrete construction of the cross section of the fuel assembly shown in FIG. 3.

The water rod 17, as shown in FIG. 5, is disposed in the center of the cross section of the fuel assembly 10. The outer diameter of the water rod 17 is selected to be greater than the pitches at which the fuel rods 16 are arranged. Specifically, the cross section of the water rod 17 occupies an area which accommodates four fuel rods 16.

Figure 6:
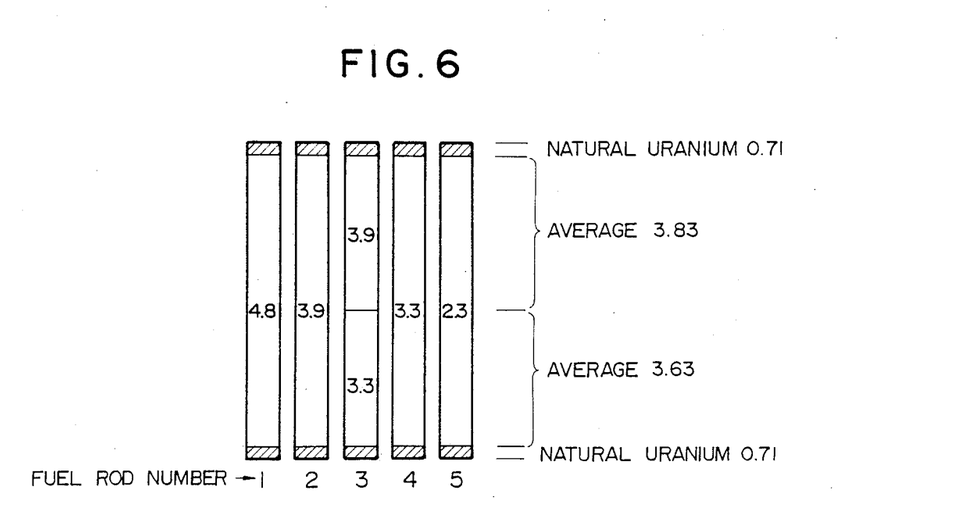
FIG. 6 is a view which serves to illustrate the enrichment distribution in each kind of fuel rod shown in FIG. 5.

A dashed line 13 in FIG. 5 represents the boundary between the periphery and the central portion when the fuel assembly 10 is viewed in cross section. The periphery in which thermal neutron flux level is high is defined outside the dashed line 13, and accommodates the fuel rods 16 disposed in the outermost periphery of the fuel assembly 10. The area inside the dashed line 13 is the central portion in which a thermal neutron flux is small compared with that in the periphery. As shown in FIG. 6, the fuel rods accommodated in the fuel assembly 10 are specifically divided into five kinds, that is, fuel rods 1 to 5. The enrichment distribution in each of the fuel rods 1 to 5 is shown in FIG. 6. Each of the fuel rods 1 to 5 has natural uranium in the region from the lower end of an effective fuel length portion (a portion charged with fuel pellets, that is the portion shown as C in FIG. 4) to the height corresponding to 1/24 of the overall axial length of the effective fuel length portion, as well as in the region from the height corresponding to 23/24 of the overall axial length of the effective fuel length portion to the upper end of the effective fuel length portion. In the case of the fuel rod 1, the enrichment in the part of the fuel effective length portion which is not charged with natural uranium is 4.8% by weight. In the case of the fuel rod 2, the enrichment in the same part is 3.9% by weight. In the case of the fuel rod 4, the enrichment in the same part is 3.3% by weight. In the case of the fuel rod 5, the enrichment in the same part is 2.3% by weight. In each of the fuel rods described above, the enrichment is uniform in the axial direction. In the case of the fuel rod 3, if the lower end of its effective fuel length portion is specified as the base point, the enrichment in the region between the position corresponding to 1/24 of the overall axial length of the effective fuel length portion and the position corresponding to 11/24 of the overall axial length of the effective fuel length portion is 3.3% by weight, as well as the enrichment in a region above the aforesaid region, that is, in the region between the position corresponding to 11/24 of the overall axial length of the effective fuel length portion and the position corresponding to 23/24 of the overall axial length of the effective fuel length portion is 3.9% by weight. In the fuel assembly 10 having the fuel rods with the above-described enrichment distribution, the average enrichment in the lower region over the range from 1/24 to 11/24 of the overall axial length of the effective fuel length portion is 3.63% by weight, whereas the average enrichment in the upper region over the range from 11/24 to 23/24 of the overall axial length of the effective fuel length portion is 3.83% by weight. The lower region of the fuel assembly 10 corresponds to the range from the lower end of the effective fuel length portion to 11/24 of the overall axial length of the effective fuel length portion, while the upper region of the fuel assembly 10 corresponds to the range from 11/24 of the overall axial length of the effective fuel length portion to the upper end of the effective fuel length portion. The average enrichment in the upper region of the fuel assembly 10 is selected to be greater than that in the lower region. Among the twenty-eight fuel rods 16 disposed in the periphery of the fuel assembly 10, sixteen fuel rods 16 (whose proportion is 57%) are selected such that the enrichment in their respective upper regions are greater than the average enrichment in the upper region of the fuel assembly 10. However, the twenty-eight fuel rods 16 disposed in the periphery of the fuel assembly 10 does not includes any fuel rod whose enrichment in its lower region is greater than the average enrichment in the lower region of the fuel assembly 10. This fact satisfies such a condition that the proportion of fuel rods whose enrichment in their respective regions are greater than the average enrichment in the lower region of the fuel assembly does not exceed 20 percent of the total number of fuel rods disposed in the periphery of the fuel assembly 10.

Figure 7A:
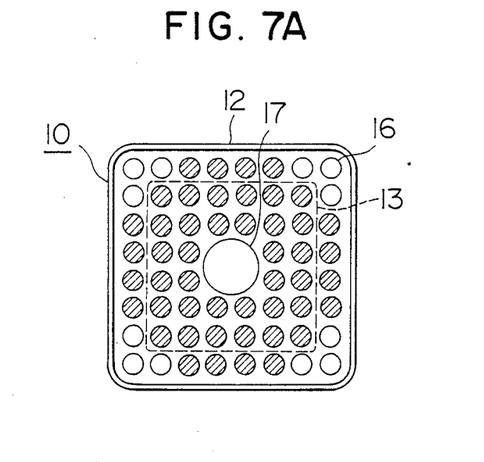
FIG. 7A is a cross-sectional view taken along line VIIA—VIIA of FIG. 3.
Figure 7B:
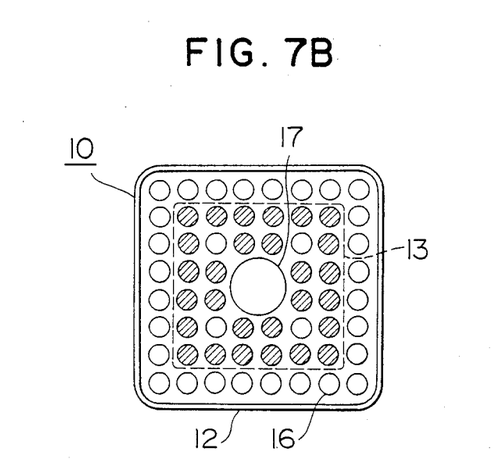
FIG. 7B is a cross-sectional view taken along line VIIB—VIIB of FIG. 3.

FIG. 7A is a cross-sectional view of the upper region of the fuel assembly 10, in which shaded circles represent the fuel rods 16 whose enrichment in their respective upper regions are greater than the average enrichment in the upper region of the fuel assembly 10. FIG. 7B is a cross-sectional view of the lower region of the fuel assembly 10, in which shaded circles represent the fuel rods 16 whose enrichment in their respective lower regions are greater than the average enrichment in the lower region of the fuel assembly 10.

When a boiling water reactor having a core in which are loaded the fuel assemblies 10 each having the above-described construction is operated, the thermal neutron flux in the central portion, although the water rod 17 is provided, becomes greater than that in the periphery under the influence of the water gap between each adjacent fuel assembly 10. Since the proportion of fuel rods 16 whose enrichment in their respective upper regions are greater than the average enrichment in the upper region of the fuel assembly 10 is 57% of the total number of fuel rods 16 disposed in the periphery of the fuel rod 10, the infinite multiplication factor in the upper region of the fuel assembly 10 is large. This leads to an increase in the infinite multiplication factor in the whole of the fuel assembly 10. On the other hand, since the fuel rods 16 whose enrichment in their respective lower regions are less than the average enrichment in the lower region of the fuel assembly 10 are disposed in the periphery of the fuel assembly, the local power peaking of the fuel assembly 10 becomes small and the maximum linear power density becomes lower than its permissible value, as well as the infinite multiplication factor in the lower region of the fuel assembly 10 becomes small.

The average enrichment of the fuel assembly 10 is remarkably large compared with that of the fuel assembly shown in FIGS. 4 and 5 in Japanese Patent Unexamined Publication No. 58-26292. Accordingly, the length of burn-up of the fuel assembly 10 is even higher than that of the known fuel assembly. In addition, the fuel assembly 10 according to the above-described embodiment involves no problem in the term of power peaking for the follower reason. In this embodiment, since the fuel rods 16 whose enrichment in their respective upper regions having a higher void fraction are greater than the average enrichment of the upper region of the fuel assembly are disposed in the upper region of the fuel assembly 10, it is possible to attain the effects described in Japanese Patent Unexamined Publication No. 58-26292, Page 4, the top of its left column, lines 11-17, that is, to greatly improve fuel economy and prolong the length of burn-up without the risk of adversely affecting any local peaking. Furthermore, in this embodiment, since the fuel rods 16 whose enrichment in their respective lower regions having a lower void fraction are greater than the average enrichment of the lower region of the fuel assembly are not disposed in the lower region of the fuel assembly 10, the increment of the local power peaking, as shown in FIG. 1, is reduced to a minimum and therefore the local power peaking can be suppressed to a low level. Thus, the maximum linear power density of the fuel assembly 10 does not exceed its permissible value.

Figure 8:
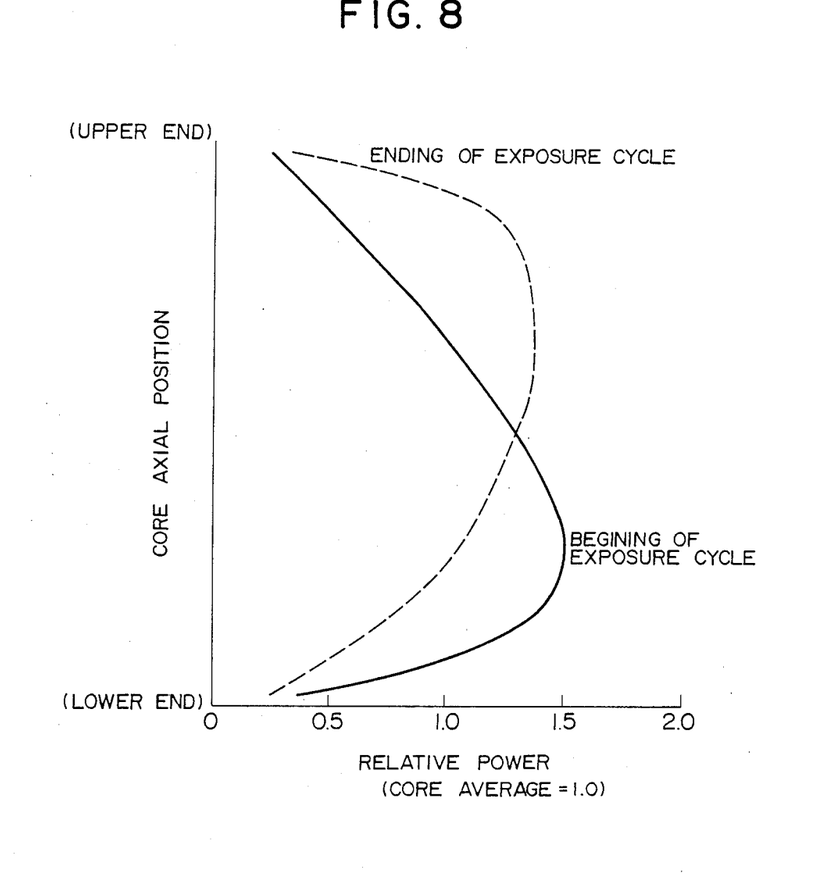
FIGS. 8 and 9 are characteristic charts respectively showing the distributions of relative power in the axial direction of a core.

The local power peaking is small in the lower region of the fuel assembly 10. Accordingly, even if a control rod is operated to form an axial power distribution whose peak, as shown in solid line in FIG. 8, is formed in the lower region of the fuel assembly 10, the maximum linear power density of the fuel assembly 10 does not exceed its permissible value. When the power distribution shown by the solid line is to be formed, the control rod may be inserted deeply into the core. The use of the fuel assembly 10 of this embodiment makes it possible to form the power distribution whose peak appears in its lower region without allowing the maximum linear power density to exceed the permissible value as described above. It is therefore possible to carry out spectral shift control which can effectively utilize fuel. In general, the spectral shift control is as follows. During the period from the beginning of a single fuel cycle to the middle of the same, the average axial power distribution in the core is formed so that its output peak may appear in the lower region of the fuel assembly 10 to increase the average void fraction in the core, thereby hardening a neutron spectrum and accelerating accumulation of plutonium in the upper region of the fuel assembly 10. By pulling out the control rod, in the final period of this fuel cycle, the average axial power distribution in the core is formed so that its power peak may appear in the upper region of the fuel assembly 10, the average void coefficient in the core is decreased, and thereby the neutron spectrum is softened. Thus, uranium 235 in the upper region of the fuel assembly 10 and the plutonium which has been accumulated in that upper region during the period from the beginning to the middle of the fuel cycle are burned to improve reactivity. In the core which accommodates the fuel assemblies 10, the axial power distribution having its peak in the upper region thereof as shown by the dashed line in FIG. 8 is formed during the final period of the fuel cycle owing to the facts that: (1) the average enrichment in the upper region of the fuel assembly 10 is greater than that in the lower region of the same; (2) more fuel rods having a large enrichment are disposed in the periphery of the upper region of the fuel assembly than in the periphery of the lower region of the same; (3) during the period from the start to the middle of one fuel cycle, a fissile material is consumed in the lower region of the fuel assembly and the fissionable material is accumulated in the upper region of the fuel assembly, as well as the control rod is pulled out. Thus, the void fraction is reduced and the reactivity can thereby be improved. for example, it is possible to improve the resistivity in the final period of one fuel cycle by 0.4% Δk. On the other hand, since the infinite multiplication factor decreases by approximately 0.2% Δk as the result of a reduction in the local power peaking in the lower region of the fuel assembly 10, the fuel economy is improved by the balance of an approximately 0.2% Δk.

Figure 9:
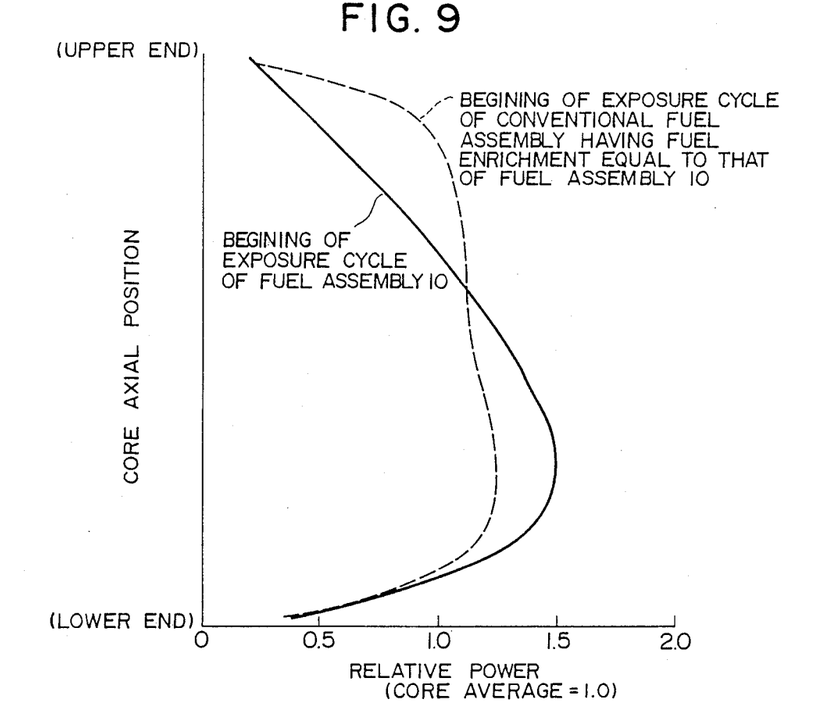

It is to be noted that, if the enrichment is averagely increased in the whole of the fuel assembly shown in FIG. 4 of Japanese Patent Unexamined Publication No. 58-26292 up to the average enrichment of the fuel assembly 10, the local power peaking in the lower region increases and the maximum linear power density becomes greater than its permissible value. To prevent the occurrence of such a phenomenon, it is necessary to pull out the control rod by about half of its axial length, and the power distribution shown by a dashed line in FIG. 9 is formed in the axial direction of the core in an initial period of one fuel cycle. Accordingly, the power distribution whose power peak appears in its lower region, such as that shown by a solid line in FIG. 9 which is formed during an initial period of the fuel cycle of the fuel assembly 10, is not formed, and spectral shift control cannot be carried out.

In order to flatten the axial power distribution as disclosed in U.S. Pat. No. 4,229,258, the boundary between the upper region of the fuel assembly whose average enrichment is large and the lower region of the fuel assembly whose average enrichment is small may preferably be established within the range from ⅓ to 7/12 of the overall axial length of the effective fuel length portion if the lower end of the effective fuel length portion of the fuel assembly is determined as the base point.

Figure 10:
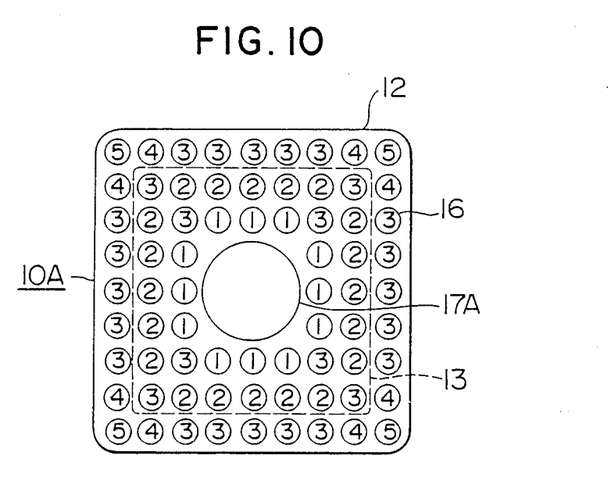
FIG. 10 is a cross sectional view showing another embodiment of the fuel assembly according to the present invention.

Another embodiment of the present invention will be described below with reference to FIG. 10. Although the above-described fuel assembly 10 has the fuel rods 16 which are disposed in a matrix of 8 rows and 8 columns, a fuel assembly 10A according to this embodiment has the fuel rods 16 which are disposed in a matrix of 9 rows and 9 columns. As in the case of the fuel assembly 10, the fuel rods 16 disposed in the fuel assembly 10A are divided into five kinds of fuel rods 1 to 5, and the differences between the fuel assemblies 10 and 10A only reside in the positions of the fuel rods and the number of fuel rods employed. A water rod 17A is disposed in the central portion of the fuel assembly 10A. The water rod 17A occupies a space which accommodates nine fuel rods 16. In the periphery of the fuel assembly 10A, twenty fuel rods 3 are disposed whose enrichment in their respective upper regions are greater than the average enrichment (3.89% by weight) in the region of the fuel assembly 10A which corresponds to the range from 11/24 to 22/24 of the overall axial length of the effective fuel length portion. The proportion of these fuel rods 3 is about 63 percent of the total number of fuel rods disposed in the periphery of the fuel assembly 10A. Therefore, the infinite multiplication factor of the upper region of the fuel assembly 10A is greater than that of the lower region of the same. On the other hand, the fuel rods disposed in the periphery of the fuel assembly 10A do not include any fuel rod whose enrichment in its lower region is greater than the average enrichment (3.66% by weight) in the region of the fuel assembly 10A which corresponds to the range from 1/24 (the lower end) to 11/24 of the overall axial length of the effective fuel length portion, and therefore the local power peaking is small in the lower region of the fuel assembly 10A. Accordingly, this embodiment can provide effects similar to those of the embodiment described previously.

The concept illustrated in FIGS. 2A, 2B, 3A and 3B of U.S. Pat. No. 4,587,090 can be applied to the fuel assembly 10. More specifically, a burnable poison is introduced into the fuel assembly 10 so that the quantity of burnable poison contained in the upper region of the fuel assembly 10 may be greater than that of burnable poison contained in the lower region of the same. The burnable poison is, for example, Gd. A concrete method for making the quantity of burnable poison contained in the upper region of the fuel assembly 10 greater than that of burnable poison contained in the lower region of the same is that the number of fuel rods containing Gd at the same density in the upper region of the fuel assembly is made greater than that in the lower region of the same. The fuel assembly 10 characterized by this axial distribution of the burnable poison can provide the effect of spectral shift utilizing the burnable poison, as shown in FIGS. 5 and 7 of U.S. Pat. No. 4,587,090. Accordingly, as compared with the fuel assembly 10 which does not have the aforesaid axial distribution of the burnable poison, the effect of spectral shift is further enhanced and therefore fuel economy is further improved.

In this case, it is likely that the difference between the infinite multiplication factor in the upper region of the fuel assembly and the infinite multiplication factor in the lower region of the fuel assembly becomes large and the shut-down margin of the reactor may consequently be narrowed. In this embodiment, however, since the peak of the axial power distribution appears in its lower region in the first half of one fuel cycle, the power output in the upper region of the fuel assembly becomes relatively small and thus the burn-up of the burnable poison in the upper region slows down. In consequence, a portion of the burnable poison remains unburnt in the final period of the fuel cycle, and the shut-down margin is improved. Finally, (1) the difference between the infinite multiplication factors in the upper region and the lower region of the fuel assembly becomes large and (2) the burnable poison partially remains unburnt, so that the influences of (1) and (2) upon the shut-down margin cancel out each other and the shut-down margin does not change.

Figure 11:
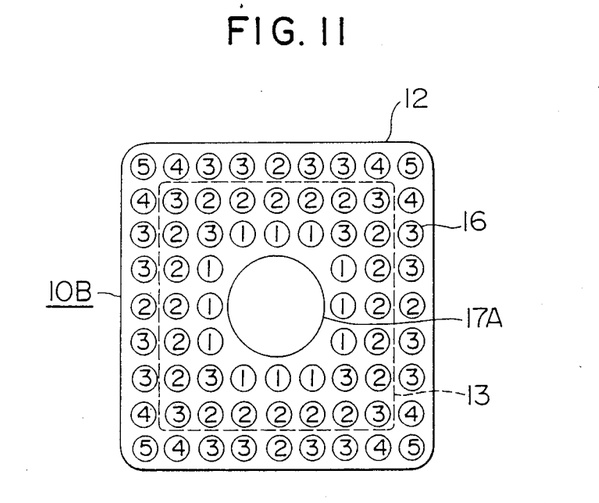
FIG. 11 is a cross sectional view showing yet another embodiment of the fuel assembly according to the present invention.
Figure 12:
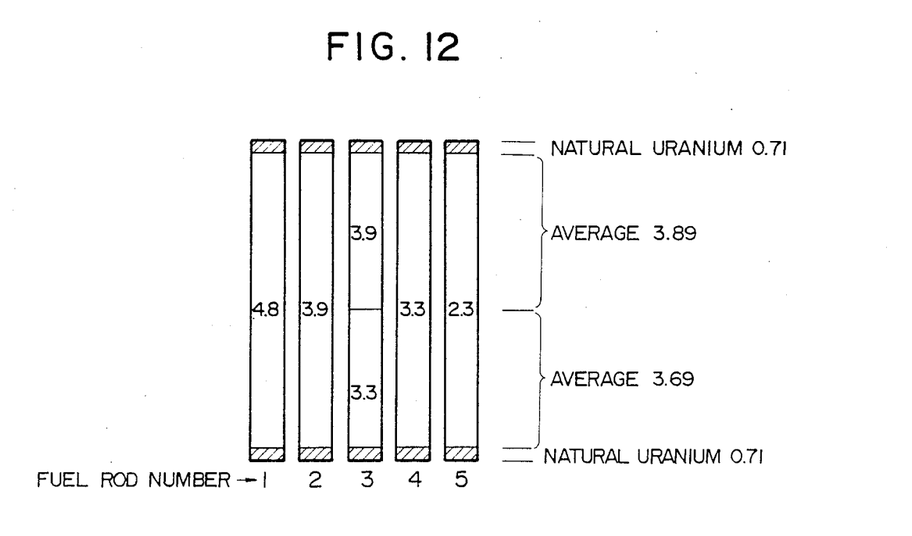
FIG. 12 is a view which serves to illustrate the enrichment distribution in each kind of fuel rod shown in FIG. 11.

Another embodiment of the fuel assembly according to the present invention will be described below with reference to FIGS. 11 and 12. The arrangement of a fuel assembly 10B according to this embodiment is substantially identical to that of the fuel assembly according to the embodiment shown in FIG. 10, and the fuel assembly 10B is characterized in that four fuel rods 2 are disposed in its periphery. The enrichment of the four fuel rods 2 in their respective lower regions are greater than the average enrichment (3.69% by weight) in the lower region of the fuel assembly 10B. The proportion of the fuel rods 2 whose enrichment in their respective lower regions are greater than the average enrichment in the lower region of the fuel assembly 10B is approximately 12.2% of the total number of fuel rods disposed in the periphery of the fuel assembly 10B. The average enrichment in the upper region of the fuel assembly 10B is approximately 3.89% by weight.

Accordingly, this embodiment is capable of providing effects similar to those of the fuel assembly 10 but, in this embodiment, the local power peaking becomes slightly large compared with that of the fuel assembly 10.

What is claimed is:

1. A fuel assembly having a plurality of fuel rods and a water rod occupying an area for accommodating at least four fuel rods, wherein, in the upper region of said fuel assembly, the proportion of fuel rods among fuel rods located in an outermost peripheral section of said fuel assembly whose enrichment in their respective upper regions is greater than the average enrichment in the upper region of said fuel assembly is not less than 50 percent, and in the lower region of said fuel assembly, the proportion of fuel rods among fuel rods located in the outermost peripheral section of said fuel assembly whose enrichment in their respective lower regions is greater than the average enrichment in the lower region of said fuel assembly is not greater than 20 percent.

2. A fuel assembly according to claim 1, wherein said average enrichment in said upper region of said fuel assembly is greater than said average enrichment in said lower region of said fuel assembly.

3. A fuel assembly according to claim 1, wherein the boundary between said upper region and said lower region is located within the range from ⅓ to 7/12 of the overall axial length of said effective fuel length portion when the lower end of said effective fuel length portion of said fuel assembly is determined as the base point.

4. A fuel assembly according to claim 2, wherein the quantity of burnable poison contained in said upper region of said fuel assembly is greater than the quantity of burnable poison contained in said lower region of said fuel assembly.

* * * * *